(12) United States Patent
Widhalm

(10) Patent No.: US 8,876,983 B2
(45) Date of Patent: Nov. 4, 2014

(54) IN-LINE CLEANING METHOD FOR ULTRASONIC WELDING TOOLS

(75) Inventor: Humi Widhalm, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 665 days.

(21) Appl. No.: 13/223,324

(22) Filed: Sep. 1, 2011

(65) Prior Publication Data

US 2013/0056025 A1   Mar. 7, 2013

(51) Int. Cl.
| | |
|---|---|
| *B08B 3/00* | (2006.01) |
| *B08B 1/00* | (2006.01) |
| *B29C 65/08* | (2006.01) |
| *B23K 20/24* | (2006.01) |
| *B23K 20/10* | (2006.01) |
| *B23K 20/26* | (2006.01) |
| *B08B 3/08* | (2006.01) |

(52) U.S. Cl.
CPC . *B08B 1/00* (2013.01); *B29C 65/08* (2013.01); *B23K 20/24* (2013.01); *B23K 20/10* (2013.01); *B23K 20/26* (2013.01); *B08B 3/08* (2013.01)

USPC ............. 134/27; 134/26; 134/29; 134/34; 134/37

(58) Field of Classification Search
None
See application file for complete search history.

(56) References Cited

U.S. PATENT DOCUMENTS 4,330,699 A * 5/1982 Farrow ............... 219/121.64
6,997,777 B2 * 2/2006 Newell .................... 451/6

* cited by examiner

*Primary Examiner* — Eric Golightly
(74) *Attorney, Agent, or Firm* — Joseph E. Root

(57) ABSTRACT

A method for in-line cleaning of ultrasonic welding tools is described. The method includes applying cleaning solution onto a work surface of a welding tool to be cleaned using an application device. Then the method involves removing residue dissolved in the cleaning solution from the work surface using a cleaning device. Next, the work surface is neutralized and rinsed using purified water and polished with a cleaning cloth. Finally, the work surface is rinsed using cleaning alcohol and blow-dried with compressed air.

10 Claims, 4 Drawing Sheets

PRIOR ART

IN-LINE CLEANING METHOD FOR ULTRASONIC WELDING TOOLS

BACKGROUND

This application relates generally to the field of ultrasonic welding, and, more particularly, to cleaning ultrasonic welding tools.

Ultrasonic Welding (USW) is a joining technique for lap joints of two or more layers of the same or dissimilar metals, such as, for example, copper and aluminum. The layers or parts to be welded are placed in a fixed anvil and a moveable horn or sonotrode makes contact with the parts to be welded. Pressure is applied to keep the horn in contact with the welded parts, and to hold them together. The horn delivers ultrasonic vibrations that heat up the parts. The vibrations move either up-and-down or side-to-side, leading to the binding of the parts. The horn is retracted, and the welded parts can be removed from the anvil.

The anvil must grip and hold one of the parts stationary during the ultrasonic vibrations. The shear forces generated during a weld cycle can be significant, and if the anvil design or mounting allows any movement, the efficiency of the weld cycle is diminished. To this end, the anvil has a gripping or weld pattern machined onto its surface. A similar pattern, which is used for gripping, with high ridges and low valleys, is also present on the horn. When the vibrations begin, the anvil weld pattern seats into a part to be welded and prevents it from vibrating. The horn, which seats into the other part to be welded, causing the part to vibrate against the stationary part seated on the anvil.

During USW, the high-frequency vibration of the horn against the welding parts causes a buildup of metal powders in the weld patterns on the horn and the anvil, resulting in decreased weld strength, due to the altered weld pattern topography. The sharp edges of certain welding tool designs may lead to high buildup rates that require frequent cleaning of the welding tools.

Unfortunately, cleaning the horn and anvil usually necessitates removal of the horn and/or anvil from the USW fixtures, significantly slowing the manufacturing process, and increasing downtime and cost. In addition, removal and then replacement of the cleaned horn and anvil requires realignment and adjustment of the tools and fixtures. This readjustment introduces unpredictability to the USW process and adds to the associated downtime and cost.

It would be desirable to have an in-line cleaning method for maintaining the continuity of the USW process, while limiting variability, downtime, and cost.

SUMMARY

One embodiment of the present application describes a method for in-line cleaning of ultrasonic welding tools including applying cleaning solution onto the work surface of the welding tool to be cleaned using an application device. Then the method involves removing residue dissolved in the cleaning solution from the work surface using a cleaning device. Next, the work surface is neutralized and rinsed using purified water and polished with a cleaning cloth. Finally, the work surface is rinsed using cleaning alcohol and blow-dried with compressed air.

Another embodiment of the present application discloses a method for in-line cleaning of ultrasonic welding tools including applying cleaning alcohol to a cleaning device used for cleaning a work surface of the welding tool. Then, residue dissolved in the cleaning alcohol is removed from the work surface using the cleaning device. The work surface is then polished with a cleaning cloth and rinsed using cleaning alcohol. Finally, the work surface is blow-dried using compressed air.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes methods method for in-line cleaning of ultrasonic welding tools. During USW, the high-frequency vibration of the horn against the welding parts can cause buildup of the metal powders in the weld patterns on the horn and the anvil, resulting in decreased weld strength due to the altered weld pattern topography.

In order to clean the buildup, the disclosed methods include applying cleaning solution onto the work surface of the welding tool and removing residue dissolved in the cleaning solution from the work surface. The work surface is then neutralized and rinsed using purified water, such as de-ionized water and polished with a cleaning cloth. Finally, the work surface is rinsed using cleaning alcohol and blow-dried with compressed air. The steps of the methods may of course vary without departing from the scope and purpose of the claimed invention.

Exemplary Embodiments

Figure 1:
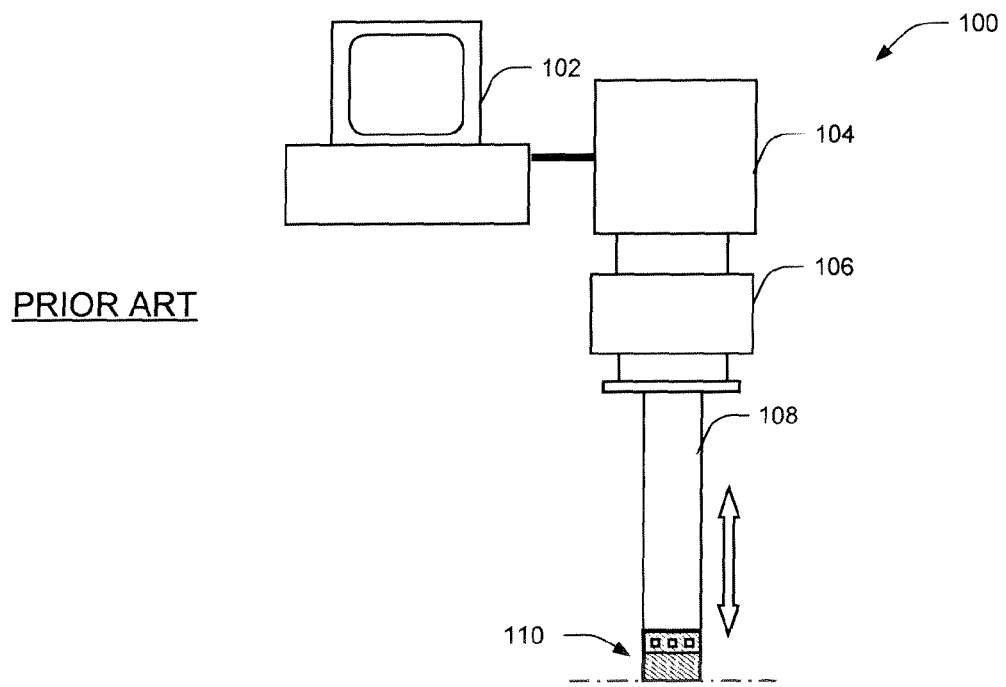
FIG. 1 illustrates the front view of a conventional ultrasonic welding (USW) tool.

FIGS. 1-5 illustrates a conventional ultrasonic welding (USW) tool 100. FIG. 1 illustrates the front view of the conventional USW tool 100. The tool 100 includes a power supply and controller 102 that converts low-frequency input current to high-frequency current. Next, a transducer 104 or converter, connected to the power supply and controller 102, changes the high-frequency current into high-frequency sound or ultrasound. A booster 106 amplifies the ultrasound vibrations. Finally, a horn 108 or sonotrode focuses the ultrasound vibrations and delivers them to parts 110 to be welded, which may, for example, be similar or dissimilar metal sheets or foils, such as copper and aluminum. The two different metal sheets or foils being welded are represented with different fill patterns. The vertical vibrations cause the metal sheets to rub against each other, and the friction raises the surface temperature of the parts 110 in contact. The generated frictional heat facilitates the formation of a joint 206, where the two parts 110 bind together.

Figure 2:
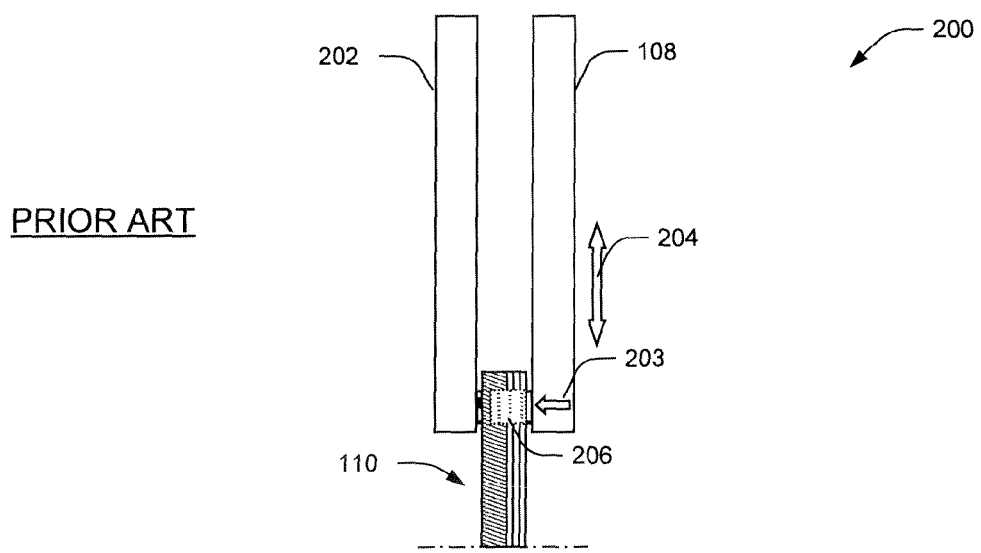
FIG. 2 depicts the side view of the conventional USW tool of FIG. 1.

FIG. 2 depicts the side view 200 of the conventional USW tool 100. In parallel with and facing the horn 108, the tool 100 further includes an anvil 202 upon which the parts 110 are stacked and held. Force may be applied from the horn 108 to the anvil 202 (for instance, air pressure supplied by a pneumatic piston) to hold the parts 110 together during welding, in the direction shown by an arrow 203. The vertical bidirectional arrow 204 represents the direction of horn 108 vibrations in the vertical direction.

Figure 3:
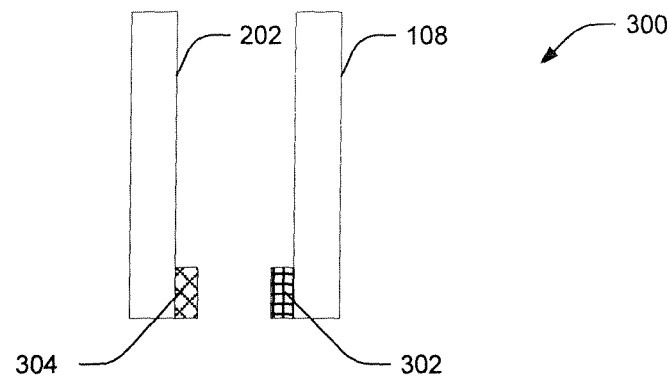
FIG. 3 depicts the side view of the conventional USW tool of FIG. 1, showing the work surfaces of an anvil and a horn.

FIG. 3 depicts the side view 300 of the conventional USW tool 100, showing work surfaces of the anvil 202 and the horn 108. For the horn 108 to transfer energy to the parts 110 being welded, the horn 108 must make contact and mechanically engage one of the parts 110. This contact is made between the horn work surfaces 302 on the horn 108 and one of the parts 110. The horn work surface 302 may form a part of the horn 108 structure and can be of any shape or size depending on the requirement, such as a square or rectangle part positioned on the end of the horn 108 facing the anvil 202. Further, the horn work surfaces 302 may protrude outward from the horn 108 surface. Generally, a weld pattern is machined into the horn work surface 302. The weld pattern allows the horn 108 to grip the part 110 being welded. The pattern may be designed with high ridges and low valleys. Similarly, a cooperating pattern may be machined into the anvil work surface 304.

Figure 4:
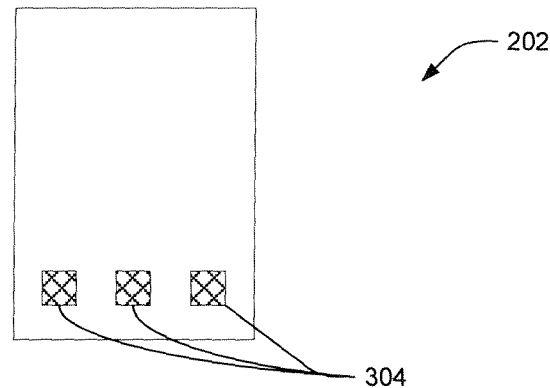
FIG. 4 is a view of the side of the anvil having the work surfaces.
Figure 5:
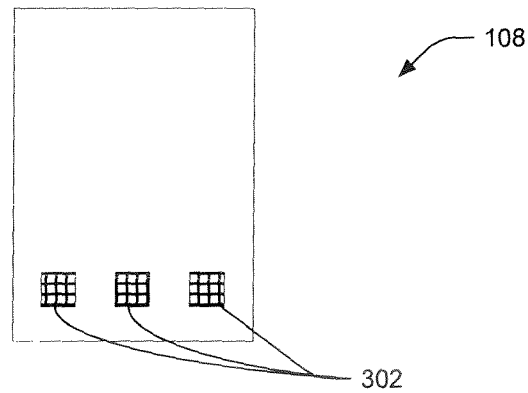
FIG. 5 is a view of the side of the horn having the work surfaces.

FIG. 4 is a view of the side of the anvil 202 having the anvil work surfaces 304. The anvil 202 has three work surfaces 304, and the weld pattern is machined onto the anvil work surfaces 304. Similarly, FIG. 5 is a view of the side of the horn 108 having the horn work surfaces 302. The horn 108 shows the weld pattern on the three horn work surfaces 302. Although FIGS. 4 and 5 show three work surfaces, the number of work surfaces 302 and 304 can vary.

During USW, the high-frequency vibration of the horn 108 against the parts 110 causes buildup of the metal powders in the weld patterns on the horn 108 and the anvil 202. In order to remove the buildup, a cleaning solution, when applied to the work surfaces, aids in dissolving the buildup. The cleaning solution may be an alkaline cleaner, for example, a mixture of Sodium Hydroxide (30 to 40%) and Water (70 to 60%), although other solutions are possible.

In addition, in the preferred embodiment, the cleaning solution is a gel that adheres to the work surfaces 302 and 304 where the metal powders build up. The gel adheres to the work surfaces long enough for an adequate reaction to take place, without flowing down or dripping off until the dissolution is complete. In general, the cleaning solution dissolves and/or softens the metal powders that build up in a short period of time, for example, 5 minutes at room temperature. The dissolved powders may then be brushed and rinsed off, as will be explained in more detail in relation to FIG. 6.

A number of devices may be required to assist the cleaning. For example, an application device may be utilized for applying the cleaning solution on the surface to be cleaned. The application device should be long and thin in shape, where one end serves as a handle and the other end has a soft application structure, such as a brush or a swab. The application structure should be soft enough to allow the application of the cleaning solution. Further, the application device end having the application structure should be narrow enough to fit in the space between the horn 108 and the anvil 202.

Similarly, a cleaning device may be used to clean the buildup from the work surfaces. The cleaning device should be long and thin in shape, where one end serves as a handle while the other end has a soft cleaning structure, such as a brush or a swab. The cleaning structure should be soft enough to allow the cleaning to take place without causing damage to or scratching the horn work surface 302, while being adequately hard to remove the dissolved buildup powder from the horn work surfaces 302. The end of the cleaning device having the cleaning structure should be narrow enough to fit in the space between the horn 108 and the anvil 202. In one embodiment, the application device and the cleaning device are one device, such as a soft-bristle toothbrush, or a soft paintbrush.

Figure 6:
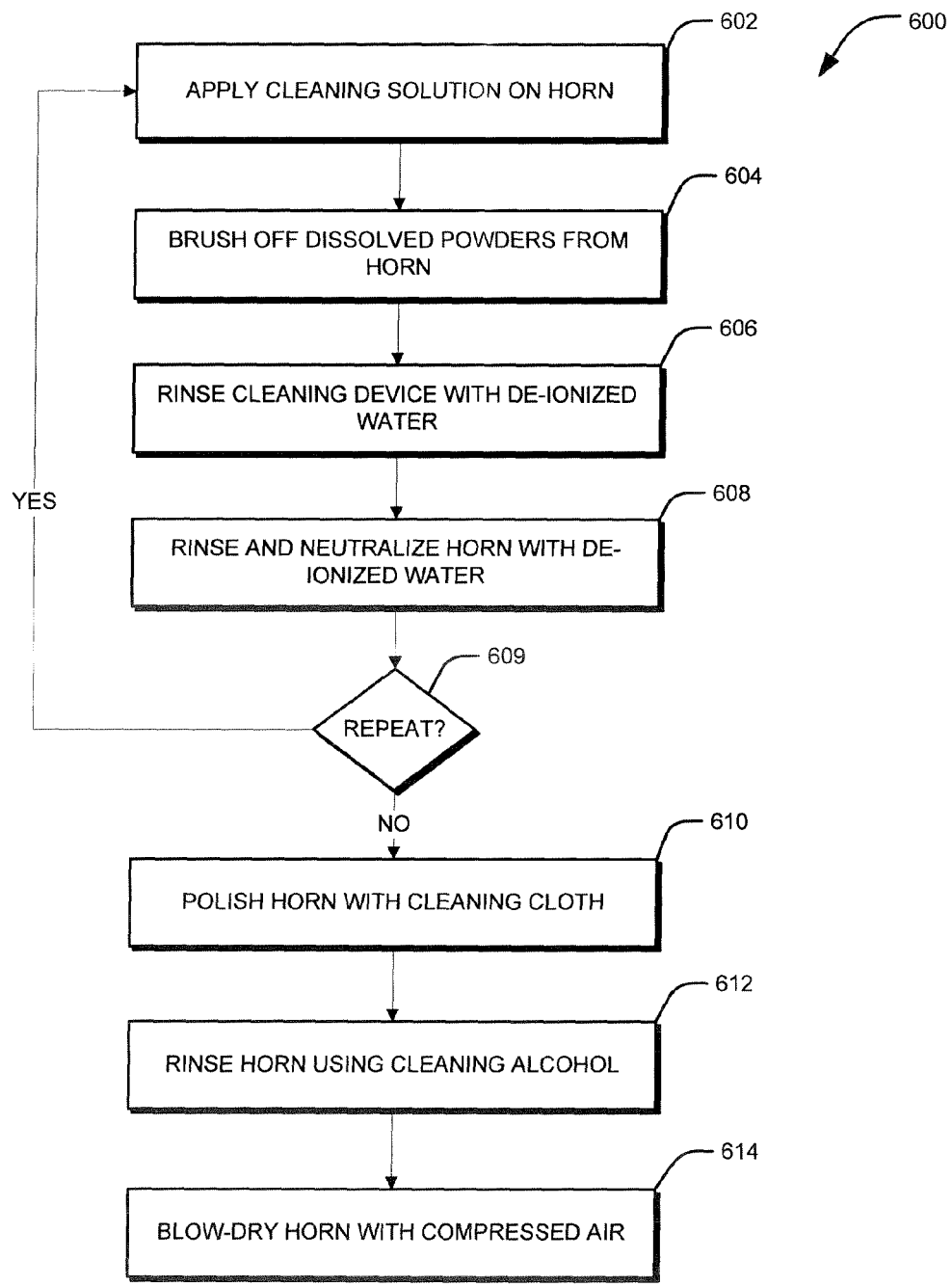
FIG. 6 is a flowchart of a method for in-line cleaning of the horn of FIG. 1.

FIG. 6 is a flowchart of a method 600 for in-line cleaning of the horn 108. Although, the present method 600 is described in relation with cleaning of the horn 108, it may be applied to the anvil 202, or any other similar surface that requires cleaning.

At step 602, the method 600 involves applying the cleaning solution onto the horn work surface 302 using an application device. It may take five minutes for the reaction to take place between the cleaning solution and the buildup powder, so the method 600 involves waiting for five minutes for the reaction to take place at room temperature.

At step 604, the dissolved metal powders are brushed off the horn work surface 302 thoroughly using the cleaning device. Then, the cleaning device is rinsed thoroughly using purified water, such as de-ionized water, until it is cleaned, at step 606. The horn work surface 302 is then neutralized and rinsed thoroughly using the de-ionized water at step 608. The steps 602 to 608 may be repeated an adequate number of times, as required, for example, three times. The need for repetition is determined at step 609. The application device and cleaning device may be cleaned between repetitions. If repetition is not required, the method 600 proceeds to step 610.

At step 610, the horn work surface 302 may be polished thoroughly using an appropriate cleaning cloth, such as a lint-free cloth. The horn work surface 302 is then rinsed using cleaning alcohol at step 612 and blow-dried using compressed air at step 614.

Figure 7:
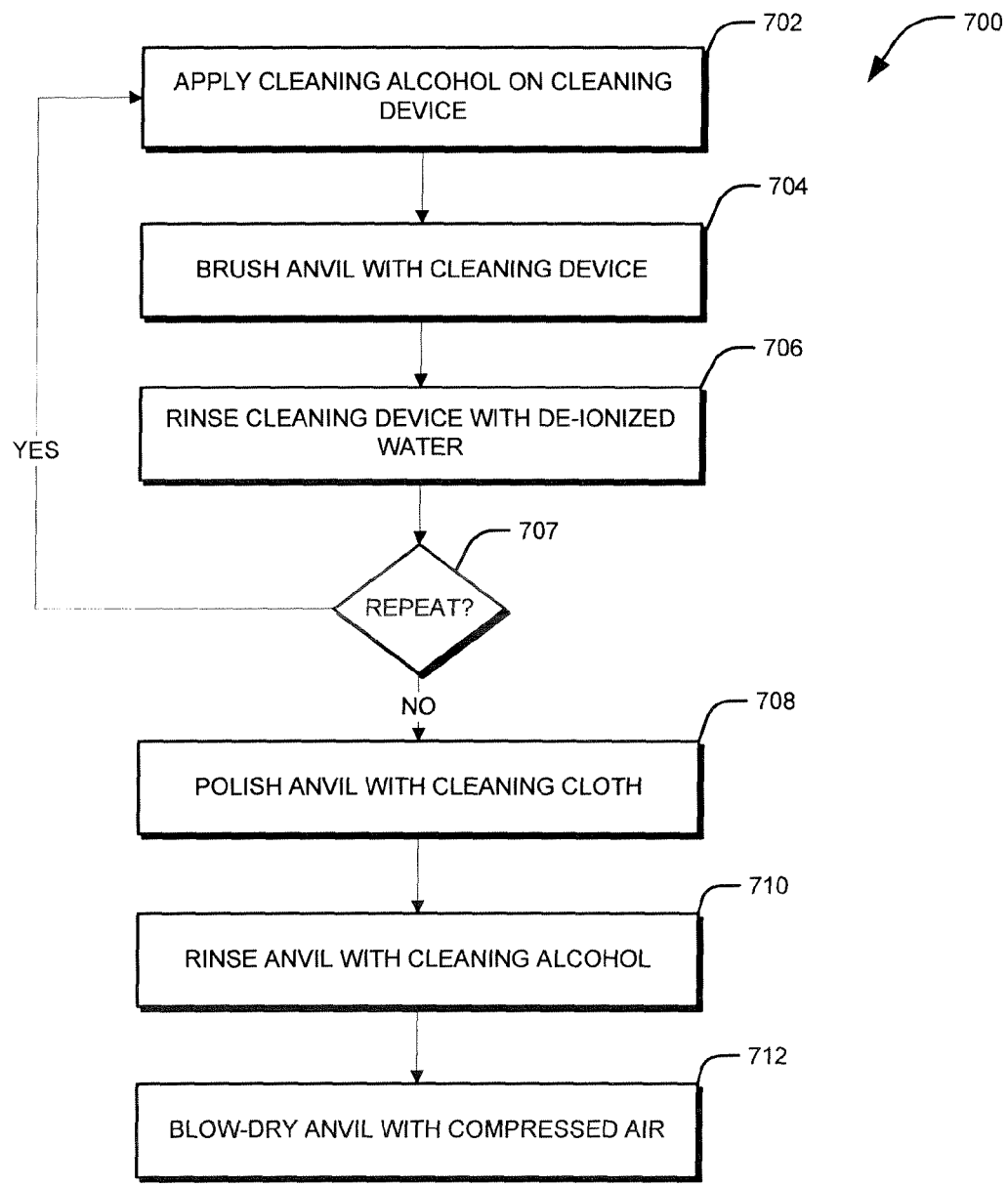
FIG. 7 depicts a flowchart of a method for in-line cleaning of the anvil of FIG. 1.

FIG. 7 depicts a flowchart of a method 700 for in-line cleaning of the anvil 202. Although, the present method 700 is described in relation with cleaning of the anvil 202, it may be applied to the horn 108, or any other similar surface that requires cleaning.

At step 702, the method 700 involves applying cleaning alcohol onto the cleaning device or alternatively, soaking the cleaning device with cleaning alcohol. Then, the anvil work surface 304 is thoroughly brushed using the cleaning device soaked with cleaning alcohol at step 704 and all sides of the cleaning device are rinsed thoroughly using de-ionized water until clean at step 706. The steps 702 to 706 may be repeated if required, for example three times. Need for repetition is determined at step 707. If repetition is not required, the method 700 proceeds to step 708.

At step 708, the anvil work surface 304 is thoroughly polished with an appropriate cleaning cloth such as a lint-free cloth. The anvil work surface 304 is thoroughly rinsed using cleaning alcohol at step 710 and blow-dried thoroughly using compressed air at step 712.

The embodiments of the in-line cleaning method disclosed herein enable effective and efficient cleaning of the horn 108 and anvil 202 without disassembling and removing the horn 108 and/or the anvil 202 from the USW fixtures. This eliminates the associated downtime and cost. In addition, the in-line cleaning methods eliminate the requirement for realignment and adjustment of the USW tool 100 and fixtures when the cleaned horn 108 and anvil 202 are returned to the USW welder. This helps to eliminate variability. Further, the disclosed embodiments of the in-line cleaning method facilitate USW process continuity.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

I claim:

1. A method for in-line cleaning of an ultrasonic welding tool, comprising:
   applying a cleaning solution onto the work surface of the welding tool using an application device;
   removing residue dissolved in the cleaning solution from the work surface using a cleaning device;
   neutralizing and rinsing the work surface using purified water;
   polishing the work surface using a cleaning cloth;
   rinsing the work surface using cleaning alcohol; and
   drying the work surface using compressed air.

2. The method of claim 1 further comprising rinsing the cleaning device using de-ionized water.

3. The method of claim 1, wherein the application device is long and thin in shape, having a soft application structure on one end.

4. The method of claim 1, wherein the cleaning device is long and thin in shape, having a soft cleaning structure on one end.

5. The method of claim 1 further comprising repeating the applying, removing, and neutralizing steps a predetermined number of times.

6. The method of claim 1, wherein the cleaning solution is an alkaline cleaning solution.

7. The method of claim 1, wherein the cleaning solution is a gel.

8. The method of claim 1, wherein the cleaning solution is a mixture including between approximately 30 to 40% Sodium Hydroxide, the remaining part of the mixture being water.

9. The method of claim 1, wherein the work surface is a work surface of a welding tool's horn.

10. The method of claim 1, wherein the purified water is de-ionized water.

* * * * *